United States Patent
Toosi et al.

(10) Patent No.: US 9,279,061 B2
(45) Date of Patent: Mar. 8, 2016

(54) PHASE CHANGE INK WITH COMPOSTABLE WAX

(75) Inventors: Salma F. Toosi, Mississauga (CA);
Maria M. Birau, Mississauga (CA);
Biby E. Abraham, Mississauga (CA);
James D. Mayo, Mississauga (CA);
Peter G. Odell, Mississauga (CA); C. Geoffrey Allen, Waterdown (CA)

(73) Assignee: Xerox Corporation, Norwalk, CT (US)

( * ) Notice: Subject to any disclaimer, the term of this patent is extended or adjusted under 35 U.S.C. 154(b) by 681 days.

(21) Appl. No.: 13/611,264

(22) Filed: Sep. 12, 2012

(65) Prior Publication Data

US 2014/0073723 A1    Mar. 13, 2014

(51) Int. Cl.
*C09D 11/34* (2014.01)
*C09D 11/12* (2006.01)
*C09D 11/322* (2014.01)
*C09D 11/03* (2014.01)

(52) U.S. Cl.
CPC ........... *C09D 11/34* (2013.01); *C09D 11/12* (2013.01); *C09D 11/322* (2013.01); *C09D 11/03* (2013.01)

(58) Field of Classification Search
CPC ........ C09D 11/34; C09D 11/12; C09D 11/03; C09D 11/322
See application file for complete search history.

(56) References Cited

U.S. PATENT DOCUMENTS

| 4,405,509 | A  | * | 9/1983  | Rogers et al. ........................ 512/4 |
| 5,952,107 | A  | * | 9/1999  | Roth et al. .................. 428/32.66 |
| 7,300,737 | B2 | * | 11/2007 | Ayaki et al. ............... 430/137.15 |
| 7,588,632 | B2 |   | 9/2009  | Masaro et al. |
| 2008/0006175 | A1 |   | 1/2008  | King et al. |
| 2010/0130657 | A1 | * | 5/2010  | Drappel et al. ............... 524/196 |

OTHER PUBLICATIONS

ALFA Chemicals Co., Industrial Functionality Details "Waxes", 2015.*
Colorific Ink Product Brochure , Feb. 19, 2012.
"IGI: Leadership Through Wax Innovation," Aug. 11, 2009.
Soya—Information about Soy and Soya Products, Feb. 19, 2012.

* cited by examiner

*Primary Examiner* — Margaret Moore
(74) *Attorney, Agent, or Firm* — Marylou J. Lavoie, Esq. LLC

(57) ABSTRACT

Disclosed is a phase change ink comprising: (a) an ink carrier comprising a compostable paraffin or polymethylene wax; and (b) a colorant.

16 Claims, No Drawings

PHASE CHANGE INK WITH COMPOSTABLE WAX

BACKGROUND

Disclosed herein are phase change inks containing waxes. More specifically, disclosed herein are phase change inks containing paraffin or polymethylene waxes that undergo degradation by biological process during composting to yield carbon dioxide, water, inorganic compounds, and biomass at a rate consistent with other known compostable materials and leave substantially no visually distinguishable or toxic residues.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks are desirable for ink jet printers because they remain in a solid phase at room temperature during shipping, long term storage, or the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, or the like), the droplets solidify immediately upon contact with the substrate, so that migration of ink along the printing medium is prevented and dot quality is improved.

Phase change inks frequently contain large amounts of non-compostable waxes, such as high molecular weight polyethylene waxes or the like, with such waxes often being present in phase change inks in amounts of about 50 percent by weight or more.

While known compositions and processes are suitable for their intended purposes, a need remains for improved phase change inks. In addition, a need remains for phase change inks with improved environmental friendliness. Further, a need remains for phase change inks containing an increased percentage of biodegradable and compostable components. Additionally, a need remains for phase change inks that exhibit improved performance in terms of ink rheology, print banding, filtration properties, jetting robustness, and/or thermal stability. There is also a need for phase change inks that can be prepared at reduced costs.

SUMMARY

Disclosed herein is a phase change ink comprising: (a) an ink carrier comprising a compostable paraffin or polymethylene wax; and (b) a colorant.

DETAILED DESCRIPTION

The following definitions appear in ASTM D6400-04 (ASTM Publications), the disclosure of which is totally incorporated herein by reference:

Degradable plastic: Degradable plastic is a plastic designed to undergo a significant change in its chemical structure under specific environmental conditions, resulting in a loss of some properties that may be measured by standard test methods appropriate to the plastic and the application in a period of time that determines its classification.

Biodegradable plastic: Biodegradable plastic is a degradable plastic in which the degradation results from the action of naturally occurring microorganism such as bacteria, fungi, and algae.

Compostable plastic: Compostable plastic is a plastic that undergoes degradation by biological processes during composting to yield carbon dioxide, water, inorganic compounds, and biomass at a rate consistent with other known compostable materials and leaves substantially no visible, distinguishable or toxic residue.

Plastic: A plastic is a material that contains as an essential ingredient one or more organic polymeric substances of large molecular weight, is solid in its finished state, and, at some stage in its manufacture or processing into finished articles, can be shaped by flow.

Polymer: A polymer is a substance consisting of molecules characterized by the repetition (neglecting ends, branch junctions, other minor irregularities) of one or more types of monomeric units.

Accordingly, materials such as polymers, including waxes, can be degradable without being necessarily biodegradable, and might be biodegradable without being necessarily compostable. A wax may biodegrade at a rate which is too slow to be considered compostable.

The inks disclosed herein contain a compostable paraffin or polymethylene wax, wherein "compostable" means that the wax undergoes degradation by biological process during composting to yield carbon dioxide, water, inorganic compounds, and biomass at a rate consistent with other known compostable materials and leaves no visually distinguishable or toxic residues, as defined in ASTM D6400-04.

By "wax" is meant an organic, plastic-like substance that is solid at ambient temperature and becomes liquid when melted. Because wax is plastic in nature, it usually deforms under pressure without the application of heat. It is solid at ambient temperature, thermoplastic, combustible, and insoluble in water.

By "paraffin wax" is meant a wax derived from crude oil. It generally consists of a complex mixture of hydrocarbons with the following general properties: nonreactive; nontoxic; good water barrier; clean-burning fuel; colorless. Paraffin waxes are characterized by a clearly defined crystal structure. The melting point of paraffin waxes generally falls between about 43 and about 71° C. Paraffin waxes often contain a large amount of straight-chain hydrocarbons, and can also contain branched hydrocarbons, such as isoparaffins and other branched materials, and cycloalkanes, such as cycloparaffins and other cyclo-containing materials. Variable characteristics within paraffin waxes include melting point, congealing point (point where a wax ceases to flow), hardness, oil content, viscosity, color, odor, functional properties such as translucency and opaqueness of the wax, solid appearance (such as dry, waxy, mottled, shiny, or the like), flexibility, or the like.

By "polymethylene wax" is meant a wax prepared by a Fischer-Tropsch process wherein carbon monoxide and hydrogen are converted into hydrocarbons. Polymethylene waxes can be prepared from the hydrogen and carbon monoxide mixture obtained by passing steam over hot coal. The synthesis can be carried out with metallic catalysts at high temperature and pressure. They are synthetic hydrocarbons, as opposed to natural hydrocarbons. Most of the alkanes produced tend to be straight-chain alkanes, although some branched alkanes are also formed. In addition to alkane formation, competing reactions result in the formation of alkenes, as well as alcohols and other oxygenated hydrocarbons. Usually, only relatively small quantities of these non-alkane products are formed. Linear grade polyethylene waxes tend to be substantially linear, whereas polymethylene waxes tend to have some degree of branching therein. Because of this branching, polymethylene waxes tend to be somewhat less crystalline and somewhat less hard compared to the substantially linear polyethylene waxes.

The paraffin or polymethylene waxes suitable for the inks disclosed herein have a median number of carbon atoms of in one embodiment at least about 20, in another embodiment at least about 24, and in yet another embodiment at least about 28, and in one embodiment no more than about 38, in another embodiment no more than about 36, and in yet another embodiment no more than about 34.

The paraffin or polymethylene waxes suitable for the inks disclosed herein have a peak melting point of in one embodiment at least about 46° C., in another embodiment at least about 60° C., and in yet another embodiment at least about 64° C., and in one embodiment no more than about 72° C., in another embodiment no more than about 70° C., in yet another embodiment no more than about 68° C., and in still another embodiment no more than about 66° C. The peak melting point of a given material is derived from a melting process such as that used in differential scanning calorimetry (DSC) and such that the melting peak temperature of the material occurs at the endothermic peak in the DSC curve.

According to ASTM D6400-04, Standard Specification for Compostable Plastic, the disclosure of which is totally incorporated herein by reference, a plastic material is considered to be satisfactorily disintegrated if after 12 weeks in a controlled composting test, no more than 10% of the plastic material's dry weight remains after sieving on a 2 mm sieve. The test method is defined as "generate laboratory thermophilic composting conditions by performing Test Method D 5338 without $CO_2$ trapping component, or ISO 16929;" these test method documents are totally incorporated herein by reference.

The compostable paraffin or polymethylene wax in one embodiment decomposes in no more than about 13 weeks, in another embodiment no more than about 12 weeks, and in yet another embodiment no more than about 11 weeks.

Examples of suitable compostable paraffin or polymethylene waxes include commercially available materials, such as IGI 1230A, IGI 1236A, IGI 1239A, IGI 1245A, IGI 1250A, IGI 1260, IGI 1266A, IGI 1297A, and ACCUMELT 72, available from The International Group, Inc. (IGI), Titusville, Pa. Other examples include those available from Sasol Wax, such as R2526, R2531, R2835, R2540, and R2542. Yet other examples include mottled waxes, which include fully refined blended waxes, such as IGI 1274, IGI 1284, IGI 1343, and IGI 1380, available from IGI. Still other examples include those available from Koster Keunen, LLC, such as Paraffin 127, Paraffin 130/135, Paraffin 133/142, Paraffin 140/145, Paraffin 150/155, and Paraffin 160/165.

The compostable paraffin or polymethylene wax is present in the ink in any desired or effective amount, in one embodiment at least about 20% by weight of the ink, in another embodiment at least about 25% by weight of the ink, in yet another embodiment at least about 30% by weight of the ink, and in still another embodiment at least about 45% by weight of the ink, and in one embodiment no more than about 80% by weight of the ink, in another embodiment no more than about 70% by weight of the ink, in yet another embodiment no more than about 65% by weight of the ink, and in still another embodiment no more than about 60% by weight of the ink.

The inks disclosed herein can also contain, in addition to the paraffin or polymethylene wax, other suitable components of a phase change carrier system or composition. The phase change carrier composition is typically designed for use in either a direct printing mode or an indirect or offset printing transfer system.

In the direct printing mode, the phase change carrier composition in one embodiment contains one or more materials that enable the phase change ink (1) to be applied in a thin film of uniform thickness on the final recording substrate (such as paper, transparency material, or the like) when cooled to ambient temperature after printing directly to the recording substrate, (2) to be ductile while retaining sufficient flexibility so that the applied image on the substrate will not fracture upon bending, and (3) to possess a high degree of lightness, chroma, transparency, and thermal stability.

In an offset printing transfer or indirect printing mode, the phase change carrier composition in one embodiment exhibits not only the characteristics desirable for direct printing mode inks, but also certain fluidic and mechanical properties desirable for use in such a system, as described in, for example, U.S. Pat. No. 5,389,958 the disclosure of which is totally incorporated herein by reference.

Any desired or effective carrier components can be used. Examples of suitable ink carrier materials include fatty amides, such as monoamides, triamides, tetra-amides, mixtures thereof, or the like. Specific examples of suitable fatty amide ink carrier materials include stearyl stearamide, triamides, such as those disclosed in U.S. Pat. No. 6,860,930, the disclosure of which is totally incorporated herein by reference, or the like. Other suitable amides, such as fatty amides including monoamides, tetra-amides, and mixtures thereof, are disclosed in, for example, U.S. Pat. Nos. 4,889,560, 4,889,761, 5,194,638, 4,830,671, 6,174,937, 5,372,852, 5,597,856, and 6,174,937, and British Patent GB 2,238,792, the disclosures of each of which are totally incorporated herein by reference.

Also suitable as phase change ink carrier materials are isocyanate-derived resins and waxes, such as urethane isocyanate-derived materials, urea isocyanate-derived materials, urethane/urea isocyanate-derived materials, mixtures thereof, or the like. Further information on isocyanate-derived carrier materials is disclosed in, for example, U.S. Pat. Nos. 5,750,604, 5,780,528, 5,782,966, 5,783,658, 5,827,918, 5,830,942, 5,919,839, 6,255,432, and 6,309,453, British Patents GB 2 294 939, GB 2 305 928, GB 2 305 670, and GB 2 290 793, and PCT Publications WO 94/14902, WO 97/12003, WO 97/13816, WO 96/14364, WO 97/33943, and WO 95/04760, the disclosures of each of which are totally incorporated herein by reference.

Additional suitable phase change ink carrier materials include microcrystalline waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, or the like, ionomers, or the like, as well as mixtures thereof.

In one specific embodiment, the phase change ink carrier comprises (a) a compostable paraffin or polymethylene wax, (b) a stearyl stearamide wax, (c) a branched triamide of the formula

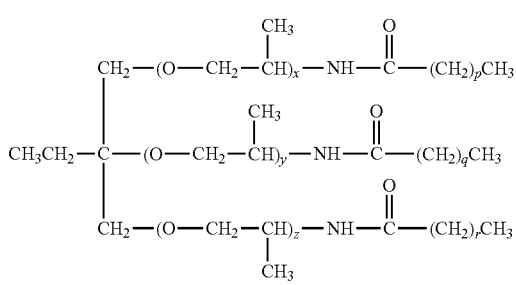

wherein x, y, and z each independently represent the number of propyleneoxy repeat units and x+y+z is from about 5 to about 6, and wherein p, q, and r each, independently of the others, are integers representing the number of repeat —(CH$_2$)— units, wherein p, q, and r have an average value of from about 35, (d) a urethane resin that is the adduct of three equivalents of stearyl isocyanate and a glycerol-based alcohol, and (e) a triglyceride of hydrogenated abietic acid.

The ink carrier is present in the phase change ink in any desired or effective amount, in one embodiment of at least about 30 percent by weight of the ink, in another embodiment of at least about 70 percent by weight of the ink, and in yet another embodiment of at least about 90 percent by weight of the ink, and in one embodiment of no more than about 99 percent by weight of the ink, in another embodiment of no more than about 98 percent by weight of the ink, and in yet another embodiment of no more than about 95 percent by weight of the ink. The term "ink carrier", as used herein, refers to those components of the ink other than the colorant or mixture of colorants.

The inks disclosed herein also contain a colorant. Any desired or effective colorant can be employed in the ink compositions, including dyes, pigments, mixtures thereof, or the like. Any dye or pigment can be chosen, provided that it is capable of being dispersed or dissolved in the ink carrier and is compatible with the other ink components. The ink compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, or the like. Examples of suitable dyes include Orasol Red 363 (BASF); Aizen Spilon Red C-BH (Hodogaya Chemical); ORASOL Yellow 2GLN, ORASOL Yellow 2RLN, ORASOL Orange G, ORASOL Brown 2RL, ORASOL Red 2B, ORASOL Blue BL, ORASOL Blue GN, ORASOL Black RLI, Yellow 3G, Orange R01, Blue B 01 (BASF); MORPLAS Red 32, MORPLAS Red 46, MORPLAS Red 60, MORPLAS Red 61, MORPLAS Red 111, MORPLAS Red 135, MORPLAS Red 179, MORPLAS Red 24, MORPLAS Red 26, MORPLAS Red 430, MORPLAS Red 5B, MORPLAS Red RO, MORPLAS Red LB, MORPLAS Magenta 36, MORPLAS FL Red 5B, MORPLAS Red 149, MORPLAS Yellow 9, MORPLAS Yellow 16, MORPLAS Yellow 33, MORPLAS Yellow 56, MORPLAS Yellow 72, MORPLAS Yellow 3G, MORPLAS Yellow 8G, MORPLAS Yellow 821, MORPLAS Yellow 825, MORPLAS Yellow GS, MORPLAS Yellow TG, MORPLAS FL Yellow G, MORPLAS FL Yellow 44, MORPLAS FL Yellow C-6, MORPLAS FL Yellow 3G, MORPLAS Orange 60, MORPLAS Orange 63, MORPLAS Orange Y, MORPLAS Amber, MORPLAS Blue 20, MORPLAS Blue 1003, MORPLAS Blue B, MORPLAS ERO Blue, MORPLAS Blue E, MORPLAS Blue 2B, MORPLAS Blue 2R, MORPLAS Blue N, MORPLAS Green 3, MORPLAS Green 5, MORPLAS Violet 14, MORPLAS Violet 3B, MORPLAS Violet R, MORPLAS Purple KI, MORPLAS Black N, NAVIPON Yellow R, NAVIPON Yellow GL, NAVIPON Yellow 2RL, NAVIPON Orange RL, NAVIPON Orange RE, NAVIPON Orange G, NAVIPON Orange R, NAVIPON Fire Red GLS, NAVIPON Fire Red G, NAVIPON Fire BL, NAVIPON Red 2BL, NAVIPON Pink 5BLG, NAVIPON Blue 2GLN, NAVIPON Blue 2GN, NAVIPON Blue 3R, NAVIPON Brown 2RL, NAVIPON Black RL, NAVIPON Black RE, MORFAST Yellow 101, MORFAST Blue 100, MORFAST Yellow 102, MORFAST Blue 105, MORFAST Brown 100, MORFAST Blue 106, MORFAST Red 101, MORFAST Green 101, MORFAST Red 102, MORFAST Black 101, MORFAST Red 105, MORFAST Black 108, MORFAST Red 106, MORFAST Black 112, MORFAST Red 109, MORFAST Black DC, MORFAST Red 111, MORFAST Violet 101 (Sunbelt Corporation); VALIFAST Yellow 3150, VALIFAST Yellow 4122, VALIFAST Orange 3208, VALIFAST RED 3304, VALIFAST Red 3312, VALIFAST Blue 2606, VALIFAST Blue 2620, VALIFAST Blue 2670, VALIFAST Black 3808, 3G, Oil Yellow GGS, Oil Yellow 105, Oil Yellow 107, Oil Yellow 129, Oil Orange PS, Oil Orange 201, Oil Red RR, Oil Red 5B, Oil Red OG, Oil Red XO, Oil Scarlet 308, Oil Scarlet 318, Oil Pink 312, Orient Violet MVB-3, Oil Brown BB, Oil Brown BF, Oil Brown 416, Oil Green 502, Orient Green 1, Oil Blue 613, Oil Blue 2N, Oil Blue 650, Oil Black HZ, Oil Black 860 (Orient Corporation of America); Savinyl Black RLS (Sandoz); Dermacarbon 2GT (Sandoz); Pyrazol Black BG (ICI); MORFAST Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 26050] (BASF), Intratherm Yellow 346 (Crompton and Knowles), C.I. Disperse Yellow 238, Neptune Red Base NB543 (BASF, C.I. Solvent Red 49), Neopen Blue FF-4012 (BASF), Lampronol Black BR (ICI; C.I. Solvent Black 35), Morton MORPLAS Magenta 36 (C.I. Solvent Red 172), metal phthalocyanine colorants such as those disclosed in U.S. Pat. No. 6,221,137, the disclosure of which is totally incorporated herein by reference, or the like. Polymeric dyes can also be used, such as those disclosed in, for example, U.S. Pat. Nos. 5,621,022 and 5,231,135, the disclosures of each of which are totally incorporated herein by reference, and commercially available from, for example, Milliken & Company as Milliken Ink Yellow 12, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

In some embodiments, solvent dyes are employed. Examples of suitable solvent dyes include Neozapon Red 492 (BASF); Orasol Red G (BASF); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (BASF); Orasol Black RLP (BASF); Savinyl Black RLS (Clariant); Morfast Black Conc. A (Rohm and Haas); Orasol Blue GN (BASF); Savinyl Blue GLS (Sandoz); Luxol Fast Blue MBSN (Pylam); Sevron Blue 5GMF (Classic Dyestuffs); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 260501] (BASF), or the like.

Pigments are also suitable colorants for the inks described herein. Examples of suitable pigments include PALIOGEN Violet 5100 (BASF); PALIOGEN Violet 5890 (BASF); HELIOGEN Green L8730 (BASF); LITHOL Scarlet D3700 (BASF); SUNFAST Blue 15:4 (Sun Chemical); Hostaperm Blue B2G-D (Clariant); Hostaperm Blue B4G (Clariant); Permanent Red P-F7RK; Hostaperm Violet BL (Clariant); LITHOL Scarlet 4440 (BASF); Bon Red C (Dominion Color Company); ORACET Pink RF (BASF); PALIOGEN Red 3871 K (BASF); SUNFAST Blue 15:3 (Sun Chemical); PALIOGEN Red 3340 (BASF); SUNFAST Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC C Orange 16 (Sun Chemical); HELIOGEN Blue K6902, K6910 (BASF); SUNFAST Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (BASF); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Ink Jet Yellow 4G VP2532 (Clariant); Toner Yellow HG (Clariant); Lumogen Yellow D0790 (BASF); Suco-Yellow L1250 (BASF); Suco-Yellow D1355 (BASF); Suco Fast Yellow DI 355, DI 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (Du Pont); PALIOGEN Black L0084 (BASF); Pigment Black K801 (BASF); and carbon blacks such as REGAL 330™ (Cabot), Nipex 150 (Degussa) Carbon Black 5250 and Carbon Black 5750 (Columbia Chemical), or the like. Other suitable pigments include those disclosed in U.S. Pat. Nos. 7,905,954; 7,503,973; 7,465,348; and 7,427,323, the disclosures of each of which are totally incorporated herein by reference.

Mixtures of two or more dyes, two or more pigments, and one or more dyes with one or more pigments can also be used.

The ink can also contain one or more dispersants and/or one or more surfactants for their known properties, such as for controlling wetting properties of the pigments in the ink composition. Examples of suitable additives include, but are not limited to, DISPERBYK-108, -163, -167, 182 (BYK-Chemie), Dow Corning 18, 27, 57, 67 Additives; ZONYL FSO 100 (DuPont); MODAFLOW 2100 (Solutia); Foam Blast 20F, 30, 550 (Lubrizol); EFKA-1101, -4046, -4047, -2025, -2035, -2040, -2021, -3600, -3232, available from BASF Additives; SOLSPERSE 13000, 13240, 17000, 19000, 19200, 20000, 21000, 34750, 36000, 39000, 41000, 54000, 71000, IRKASPERSE 2153 and 2155, available from Lubrizol Corporation, or the like. Individual dispersants or combinations may optionally be used with synergists including SOLSPERSE 5000, 22000 (Lubrizol); SunFlo SFD-B124 available from Sun Chemicals; or the like. When present, the optional additives may each, or in combination, be present in the ink in any desired or effective amount, in one embodiment at least about 0.1 percent by weight of the ink, and in another embodiment at least about 0.5 percent by weight of the ink, and in one embodiment no more than about 15 percent by weight of the ink, and in another embodiment no more than about 12 percent by weight of the ink.

The colorant is present in any desired or effective amount to obtain the desired color or hue, in one embodiment at least about 0.5 percent by weight of the ink, in another embodiment at least about 1 percent by weight of the ink, and in yet another embodiment at least about 2 percent by weight of the ink, and in one embodiment no more than about 30 percent by weight of the ink, in another embodiment no more than about 20 percent by weight of the ink, in yet another embodiment no more than about 15 percent by weight of the ink, in still another embodiment no more than about 12 percent by weight of the ink, and in yet another embodiment no more than about 10 percent by weight of the ink.

When the colorant is a pigment, in some embodiments, the inks exhibit improved average particle size and average particle size stability. By this is meant that when the Z-average particle size of the ink is measured using, for example, a Malvern Zetasizer (model #ZEN 3600 HT) at 110° C. for a freshly made ink, followed by aging the ink in an oven at a temperature such as 120° C. for specified numbers of days and then re-measuring the ink Z-average particle size, (a) the Z-average particle size is in a desirable initial range, and (b) the Z-average particle size remains relatively stable over time. Desirable initial Z-average particle sizes are, in one embodiment at least about 30 nm, in another embodiment at least about 40 nm, and in yet another embodiment at least about 60 nm, and in one embodiment no more than about 250 nm, in another embodiment no more than about 200 nm, in yet another embodiment no more than about 160 nm, and in still another embodiment no more than about 120 nm. Desirable particle size stability over time is, in one embodiment, at about 120° C., a relative change (either increase or decrease) in Z-average particle size of no more than about 2% per day, in another embodiment no more than about 1% per day, in yet another embodiment no more than about 0.5% per day, and in still another embodiment no more than about 0.2% per day, as the inks are aged for a period of time, such as 7 days at elevated temperatures such as 120° C.

The inks can also optionally contain an antioxidant. The optional antioxidants of the ink compositions protect the images from oxidation and also protect the ink components from oxidation during the heating portion of the ink preparation process. Specific examples of suitable antioxidants include NAUGUARD® 524, NAUGUARD® 76, NAUGUARD® 445, and NAUGUARD® 512 (commercially available from Uniroyal Chemical Company, Oxford, Conn.), IRGANOX® 1010 (commercially available from Ciba Geigy), or the like, as well as mixtures thereof. When present, the optional antioxidant is present in the ink in any desired or effective amount, in one embodiment of at least about 0.01 percent by weight of the ink, in another embodiment of at least about 0.1 percent by weight of the ink, and in yet another embodiment of at least about 1 percent by weight of the ink, and in one embodiment of no more than about 20 percent by weight of the ink, in another embodiment of no more than about 5 percent by weight of the ink, and in yet another embodiment of no more than about 3 percent by weight of the ink.

Other optional additives to the inks include clarifiers, such as UNION CAMP® X37-523-235 (commercially available from Union Camp), in an amount in one embodiment of at least about 0.01 percent by weight of the ink, in another embodiment of at least about 0.1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 and KE-100 Resins, triglycerides of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), or the like, as well as mixtures thereof, in an amount in one embodiment of at least about 0.1 percent by weight of the ink, in another embodiment of at least about 5 percent by weight of the ink, and in yet another embodiment of at least about 10 percent by weight of the ink, and in one embodiment of no more than about 98 percent by weight of the ink, in another embodiment of no more than about 75 percent by weight of the ink, and in yet another embodiment of no more than about 50 percent by weight of the ink, adhesives, such as VERSAMID® 757, 759, or 744 (commercially available from Henkel), in an amount in one embodiment of at least about 0.1 percent by weight of the ink, in another embodiment of at least about 1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), or the like, as well as mixtures thereof, in an amount in one embodiment of at least about 0.1 percent by weight of the ink, in another embodiment of at least about 1 percent by weight of the ink, and in yet another embodiment of at least about 2 percent by weight of the ink, and in one embodiment of no more than about 50 percent by weight of the ink, in another embodiment of no more than about 30 percent by weight of the ink, and in yet another embodiment of no more than about 10 percent by weight of the ink, or the like, as well as mixtures thereof.

The inks disclosed herein are phase change inks. By this is meant that they are solids at a temperature of about 25° C. and are liquids when melted at temperatures of at least about 40° C. or higher.

The ink compositions in one embodiment have melting points of no lower than about 50° C., in another embodiment of no lower than about 70° C., and in yet another embodiment of no lower than about 80° C., and have melting points in one embodiment of no higher than about 160° C., in another embodiment of no higher than about 140° C., and in yet another embodiment of no higher than about 100° C.

The ink compositions generally have melt viscosities at the jetting temperature (in one embodiment no lower than about 75° C., in another embodiment no lower than about 100° C., and in yet another embodiment no lower than about 110° C., and in one embodiment no higher than about 160° C., and in another embodiment no higher than about 130° C.) in one embodiment of no more than about 30 centipoise (cP), in another embodiment of no more than about 20 cP, and in yet another embodiment of no more than about 15 cP, and in one embodiment of no less than about 2 cP, in another embodiment of no less than about 5 cP, and in yet another embodiment of no less than about 7 cP. In another specific embodiment, the inks have viscosities of from about 7 to about 15 cP at temperatures of about 110, 115, or 120° C.

More specifically, at temperatures of about 110° C., the inks have viscosities of in one embodiment at least about 7 cP, and in another embodiment at least about 9 cP, and in one embodiment no more than about 20 cP, in another embodiment no more than about 16 cP, and in yet another embodiment no more than about 14 cP.

The ink compositions can be prepared by any desired or suitable method. For example, the ink ingredients can be mixed together, followed by heating, to a temperature in one embodiment of at least about 100° C., and in one embodiment of no more than about 140° C., and stirring until a homogeneous ink composition is obtained, followed by cooling the ink to ambient temperature (typically from about 20 to about 25° C.). The inks are solid at ambient temperature. In a specific embodiment, during the formation process, the inks in their molten state are poured into molds and then allowed to cool and solidify to form ink sticks.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, or the like. Phase change inks as disclosed herein can also be used in printing processes other than hot melt ink jet printing processes.

Any suitable substrate or recording sheet can be employed, including plain papers such as XEROX® 4024 papers, XEROX® 4200 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, or the like, transparency materials, fabrics, textile products, plastics, polymeric films, inorganic substrates such as metals and wood, or the like.

Specific embodiments will now be described in detail. These examples are intended to be illustrative, and the claims are not limited to the materials, conditions, or process parameters set forth in these embodiments. All parts and percentages are by weight unless otherwise indicated.

The ink materials used in the examples are presented in the table below:

| Material | Description |
|---|---|
| ACCUMELT R3910F | fractionated non-compostable polymethylene wax (IGI); median #carbon atoms: 48; peak melting point (DSC): 89° C. |
| IGI 1266A | fractionated biodegradable and compostable polyethylene wax (IGI); median #carbon atoms: 34; peak melting point (DSC): 70.5° C. |
| ACCUMELT 72 | fractionated biodegradable and compostable polyethylene wax (IGI); median #carbon atoms: 34; peak melting point (DSC): 68.4° C. |
| triamide wax | as prepared in Example 2 of U.S. Pat. No. 6,860,930 |
| KEMAMIDE S-180 | stearyl stearamide (Witco Chemical Corporation) |
| KE-100 ® | ester of tetrahydroabietic acid and glycerol (Arakawa Industries) |
| urethane resin | as prepared in Example 4 of U.S. Pat. No. 6,309,453 |
| NAUGARD 445 | antioxidant (Uniroyal Chemical Company) |
| cyan dye | as prepared in Example 6 of U.S. Pat. No. 7,781,026 |
| cyan pigment | C.I. Pigment Blue 15:3 (Clariant GmbH) |

Example I

Preparation of Ink 1, Ink 2, and Ink 3

Comparative

Hereinafter "ppw" refers to parts by weight. In a 600 mL beaker were added 73.75 ppw KEMAMIDE S-180 (132.75 g) and 10.5 ppw (18.9 g) SOLSPERSE 13240 (pigment dispersant; obtained from Lubrizol). The materials were melted in an oven at 120° C. The molten waxes were mixed with a Cowles blade at 500 rpm, during which 15 ppw (27 g) cyan pigment and 0.75 ppw (1.35 g) SOLSPERSE 5000 (pigment dispersant; obtained from Lubrizol) were added gradually to the mixture. At the end of the addition, the ink concentrate was stirred at 500 rpm for 1 h at 120° C. The resulting concentrate mixture was then transferred to a UNION PROCESS 01 attritor, obtained from Union Process, which was also heated to 120° C., and charged with 1800 g 440C type ⅛ inch diameter stainless steel balls obtained from Hoover Precision Products. A heated impeller was attached to the assembly, whereupon the impeller speed was adjusted such that the stainless steel balls at the top of the vessel began to tumble gently over each other. The concentrate was allowed to attrite for 48 h at 300 rpm. The molten concentrate was then isolated from the stainless steel balls via a sieve upon which a portion of the concentrate (13.3 g) was then placed into a pre-heated vessel with pre-heated stirrer bar and allowed to stir for 10 minutes. To this were slowly added, having already been melted and thoroughly mixed at 120° C., either [(1) a compostable paraffin wax (IGI 1266A) 49.93 ppw (49.93 g); (2) 49.93 ppw (49.93 g) of a compostable paraffin wax (ACCUMELT 72), or (3) 49.93 ppw (49.93 g) of a polymethylene wax (ACCUMELT R3910)]; 12.5 ppw (12.5 g) of a branched triamide; 14.5 ppw (14.5 g) KE-100 resin; 4 ppw (4 g) of urethane resin; 4.97 ppw (4.97 g) KEMAMIDE S-180; 0.6 ppw (0.6 g) SOLSPERSE 13240; and 0.17 ppw (0.17 g) NAUGARD-445. The resultant ink was stirred for 2 h at 120° C. and then filtered through a 5 μm stainless steel mesh.

Example II

Preparation of Pigmented Ink 4, Ink 5, Ink 6, and Ink 7

A UNION PROCESS 01 attritor pre-heated to 120° C. was charged with 1800 g ⅛ inch 440C Grade 25 stainless steel balls, obtained from Hoover Precision Products Incorporated, that were also preheated to 120° C. Over the steel shots was poured 160 g of a molten mixture containing dispersant (either SOLSPERSE 13240 (Lubrizol) or one as prepared in Example 1 of U.S. Pat. No. 7,973,186, the disclosure of which is totally incorporated herein by reference), compostable wax, triamide resin, KEMAMIDE S-180, KE-100, urethane resin, and NAUGARD-445. At this point, the pigment and synergist (either SOLSPERSE 5000 (Lubrizol), or SUNFLO SFD B-124 (Sun Chemical), were added to the molten mixture in the attritor vessel. A multi-staged impeller was then attached to the attritor and the speed adjusted to about 300 rpm. The pigmented mixture was allowed to attrite overnight for 17 h. The resultant ink was separated from the steel shot and filtered through a 5 μm stainless steel mesh. Specific ink formulations are presented in the table below:

| Component | Pigmented Ink 4 | Pigmented Ink 5 | Pigmented Ink 6 | Pigmented Ink 7 |
|---|---|---|---|---|
| pigment | 2.00 | 2.00 | 1.99 | 1.99 |
| dispersant as prepared in Example 1 of U.S. Pat. No. 7,973,186 | 0 | 0 | 1.63 | 1.63 |
| SUNFLO SFD B-124 | 0 | 0 | 0.5 | 0.5 |
| SOLSPERSE 13240 | 2.4 | 2.4 | 0 | 0 |
| SOLSPERSE 5000 | 0.25 | 0.25 | 0 | 0 |
| KEMAMIDE S-180 | 14.50 | 14.50 | 17.37 | 17.37 |
| KE-100 | 14.50 | 14.50 | 12.47 | 12.47 |
| branched triamide | 15.68 | 15.68 | 12.47 | 12.47 |
| urethane resin | 2.5 | 2.5 | 2.35 | 2.35 |
| antioxidant | 0.17 | 0.17 | 0.31 | 0.31 |
| IGI 1266A wax | 48 | 0 | 50.93 | 0 |
| ACCUMELT 72 wax | 0 | 48 | 0 | 50.93 |

Example III

Pigmented Ink Characterization

Rheology

Pigmented inks 1 through 7 were evaluated at 110° C. as they were measured using a 50 mm cone and plate geometry on a RFS-III rheometer, obtained from Rheometrics Corporation (now TA Instruments). The shear viscosities at 1 and 100 s$^{-1}$ were determined from the shear rate sweep extending from 1 to approximately 251.2 s$^{-1}$. An appropriate target viscosity range of the ink was ~8 to 12 cP, and better Newtonian behavior is realized when the viscosities at each of these comparative shear rates, such as at 1 and 100 s$^{-1}$, is minimized, such as being less than 1 cP, or 0.5 cP, or zero. The rheology studies indicated that the Newtonian behavior of the inks was not affected by the replacement of non-compostable wax with compostable waxes:

Example IV

Pigmented Ink Characterization

Particle Size Stability

Pigmented inks through 7 were assessed for particle size using a MALVERN ZETASIZER (model ZEN3600 HT).

Though the particle size measurements proceeded at 110° C., the inks, having their initial particle sizes measured, were aged in an oven at 120° C. for at least 3 days and then re-measured. It is a very desired quality that pigmented inks be stable over time, such that the particle size of the molten ink should not change to any significant extent over a time period such as 6 or 7 days. Average particle size results ($Z_{avg}$) are reported in the table below:

| Ink | Z-avg fresh ink (nm) | Z-avg aged ink (nm) | days Ink aged | % change in Z-avg per day of aging | banding test printer temperature (° C.) | banding SIR after 3 days in printer |
|---|---|---|---|---|---|---|
| 1 | 125.9 | 126.1 | 6 | 0.03 | 118 | 2 |
| 2 | 126.1 | 127.4 | 6 | 0.17 | 118 | 1 |
| 3 (comparative) | 148.7 | 150.1 | 5 | 0.19 | 118 | 3 |
| 4 | 136.7 | 123.7 | 3 | −3.17 | 118 | 2 |
| 5 | 130.3 | 116.4 | 3 | −3.56 | 118 | 1 |
| 6 | 113.2 | 115 | 6 | 0.27 | 128 | 6 |
| 7 | 115.3 | 118 | 6 | 0.39 | 128 | 0 |

As the results indicate, several of the pigmented inks prepared with the compostable waxes had similar or better particle size stabilities compared to the ink containing the noncompostable polyethylene wax in Comparative Example 3.

Banding of a pigmented ink, an undesirable print feature, manifests itself as discreet and varying optical density across the printed page. The main reason for this occurrence is believed to be various levels of pigment particles that settle in the printhead as the pigmented ink is aged over time. Banding assessment of a test ink is employed to provide preliminary information about printhead stability of that ink. The banding test consisted of keeping an ink in the printhead at an elevated temperature for 3 days at either 118 or 128° C. The printhead initially was flushed thoroughly with clear ink base to eliminate any previous test ink, thereby eliminating cross-contamination between inks. Upon loading the test ink in the printer a full 100% density solid print was made on XEROX DIGITAL COLOR XPRESSIONS PLUS copy paper. Another such print was made onto the same paper at the end of the test and compared to the initial print.

Banding on a printed page represents variable optical density across the page caused by unstable ink in the printhead. Because of the relatively high temperature of the banding test, instability of the ink can be realized from a physical separation and/or settling of particles, chemically induced separation of pigment particles, and/or unwanted printhead interaction. Banding of a print was assessed qualitatively. The prints were evaluated using a Standard Image Reference test or SIR test. The banding SIRs of various prints were rated on a scale from 0 to 5 such that a banding SIR rating of greater than 2 was undesirable. A rating of 0 on a print from freshly loaded ink in the printer was deemed as the best possible banding result such that the print appeared very uniform visually across the page and such that there was no apparent visual difference between that print and the print that was generated from an ink that was aged in the printer for a period of time of, for example, 3 days at a temperature of, for example, 118° C. A banding SIR rating of 5 was deemed as a very poor banding result such that either missing jets and/or various nozzles jetting various loadings of pigment because of pigment settling led to a very undesirable optical density variation across the page. Intermediate banding SIR ratings of 1 to 4 had increasing levels of banding. A rating of 6 was given to an extremely poor result.

As shown in the table above, the aged comparative pigmented ink 3 containing the noncompostable wax showed something of a banding failure with a SIR rating of 3. The banding SIR results of pigmented inks 1 and 4 showed slight banding when compared to the day zero prints. The banding SIR results of pigmented inks 2 and 5 showed slightly more banding than pigmented inks 1 and 4 but proved to be more stable than the comparative pigmented ink 3. Pigmented ink 6 displayed very poor stability in printer, after the ink was held in the printer for 3 days at 128° C., such that the failure mode was different from the typical banding pattern observed. In the case of pigmented ink 6, it was found that several of the printer's printhead jets were clogged, representing an atypical but gross failure mode outside of the typical banding SIR rating range from 0 to 5. Pigmented ink 7 jetted uniformly when compared to the day zero prints for banding and had an SIR rating of 0.

Example V

Preparation of Dye Inks 1 Through 4

A molten and thoroughly mixed blend of a compostable paraffin wax (ACCUMELT 72, IGI), a triamide resin, KE-100 resin, KEMAMIDE S-180, urethane resin, and NAUGARD-445 are placed into a 600 mL beaker on a hot plate and allowed to stir for 1 h at 120° C. To this is slowly added the dye. The resultant ink is stirred for 2.5 h at 120° C. and then filtered through a 5 µm stainless steel mesh and 1 µm paper filter, respectively. The dyes used are: Cyan: prepared as described in Example 1 of U.S. Pat. No. 6,472,523, the disclosure of which is totally incorporated herein by reference. Magenta 1: prepared as described in Example 1 of U.S. Pat. No. 6,998,493, the disclosure of which is totally incorporated herein by reference. Magenta 2: prepared as described in Example 1 of U.S. Pat. No. 6,9584,06, the disclosure of which is totally incorporated herein by reference. Yellow: prepared as described in Example 1 of U.S. Pat. No. 6,713,614, the disclosure of which is totally incorporated herein by reference. Black dye component 1: VALIFAST BLACK 3850, prepared as described in Example 1 of U.S. Pat. No. 7,294,730, the disclosure of which is totally incorporated herein by reference; Black dye component 2: Color Index Disperse Orange 47 dye (C.I. DO-47, obtained from Keystone Aniline Corporation, Chicago, Ill.). Specific amounts are as follows:

| Ingredient | Dye Ink 1 | Dye Ink 2 | Dye Ink 3 | Dye Ink 4 |
|---|---|---|---|---|
| ACCUMELT 72 | 81.76 g | 84.7 g | 81.7 g | 81.76 g |
| branched triamide | 50.1 ppw | 52.94 ppw | 51.08 ppw | 50.1 ppw |
| | 20.96 g | 23.7 g | 21.1 g | 20.96 g |
| | 13.1 ppw | 14.82 ppw | 13.19 ppw | 13.1 ppw |

-continued

| Ingredient | Dye Ink 1 | Dye Ink 2 | Dye Ink 3 | Dye Ink 4 |
|---|---|---|---|---|
| KE-100 | 20.0 g<br>12.5 ppw | 21.5 g<br>13.42 ppw | 19.16 g<br>11.98 ppw | 20.0 g<br>12.5 ppw |
| KEMAMIDE S-180 | 22.56 g<br>14.1 ppw | 22.8 g<br>14.25 ppw | 23.4 g<br>14.62 ppw | 22.56 g<br>14.1 ppw |
| urethane resin | 6.72 g<br>4.2 ppw | 1.44 g<br>0.9 ppw | 6.84 g<br>4.28 ppw | 6.72 g<br>4.2 ppw |
| N-445 | 0.32 g<br>0.2 ppw | 0.256 g<br>0.17 ppw | 0.32 g<br>0.2 ppw | 0.32 g<br>0.2 ppw |
| cyan dye | 0 | 5.616 g<br>3.51 ppw | 0 | 0 |
| yellow dye | 8.0 g<br>5 ppw | 0 | 0 | 0 |
| magenta dye 1 | 0 | 0 | 4.41 g<br>2.76 ppw | 0 |
| magenta dye 2 | 0 | 0 | 3.02 g<br>1.89 ppw | 0 |
| black dye component 1 | 0 | 0 | 0 | 6.8 g<br>4.25 ppw |
| black dye component 2 | 0 | 0 | 0 | 1.2 g<br>0.75 ppw |

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A phase change ink comprising:
   (a) an ink carrier comprising a compostable paraffin or polymethylene wax; and
   (b) a colorant, wherein the colorant is a pigment; and
   wherein the ink exhibits a Z-average particle size of no more than about 250 nm.

2. An ink according to claim 1 wherein the compostable wax is a paraffin wax.

3. An ink according to claim 1 wherein the compostable wax is a polymethylene wax.

4. An ink according to claim 1 wherein the compostable wax has a median number of carbon atoms of from about 20 to about 38.

5. An ink according to claim 1 wherein the compostable wax has a peak melting point of from about 46 to about 72° C.

6. An ink according to claim 1 wherein the compostable wax decomposes in no more than about 12 weeks under the composting conditions of ASTM D6400-04.

7. An ink according to claim 1 wherein the compostable wax is present in the ink in an amount of from about 20 to about 80% by weight of the ink.

8. An ink according to claim 1 wherein the ink carrier further comprises an amide.

9. An ink according to claim 1 wherein the ink carrier further comprises a urethane resin.

10. An ink according to claim 1 wherein the ink exhibits a change in Z-average particle size of no more than about 2% per day when subjected to a temperature of about 120° C. for a period of about 7 days.

11. An ink according to claim 1 wherein the colorant is a dye.

12. An ink according to claim 1 having a viscosity of from about 7 to about 20 cP at about 110° C.

13. A phase change ink comprising:
   (a) an ink carrier comprising:
      (i) a compostable paraffin or polymethylene wax;
      (ii) an amide which is a tetra-amide or a branched tria-mide;
      (iii) a monoamide; and
      (iv) a urethane resin; and
   (b) a colorant;
   wherein the compostable wax has median number of carbon atoms of from about 24 to about 36.

14. An ink according to claim 13 wherein the colorant is a pigment and wherein the ink exhibits a change in Z-average particle size of no more than about 2% per day when subjected to a temperature of about 120° C. for a period of about 7 days.

15. A phase change ink comprising:
   (a) an ink carrier comprising:
      (i) a compostable paraffin or polymethylene wax;
      (ii) an amide which is a tetra-amide or a branched tria-mide;
      (iii) a monoamide; and
      (iv) a urethane resin; and
   (b) a colorant;
   wherein the compostable wax decomposes in no more than about 13 weeks under the composting conditions of ASTM D6400-04.

16. An ink according to claim 15:
   wherein the ink exhibits a change in Z-average particle size of no more than about 2% per day when subjected to a temperature of about 120° C. for a period of about 7 days.

* * * * *